July 4, 1933.    P. D'HUC DRESSLER    1,916,363
TUNNEL KILN
Filed Nov. 14, 1930    4 Sheets-Sheet 1
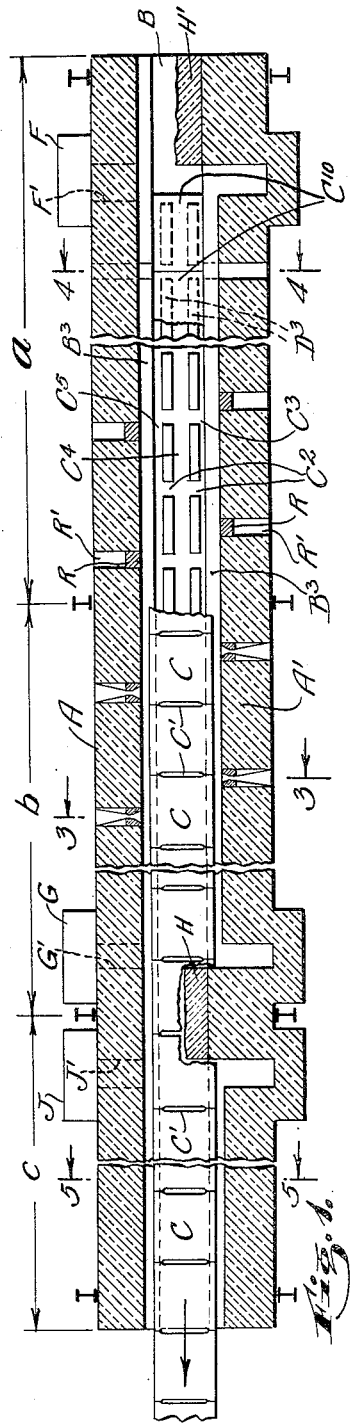
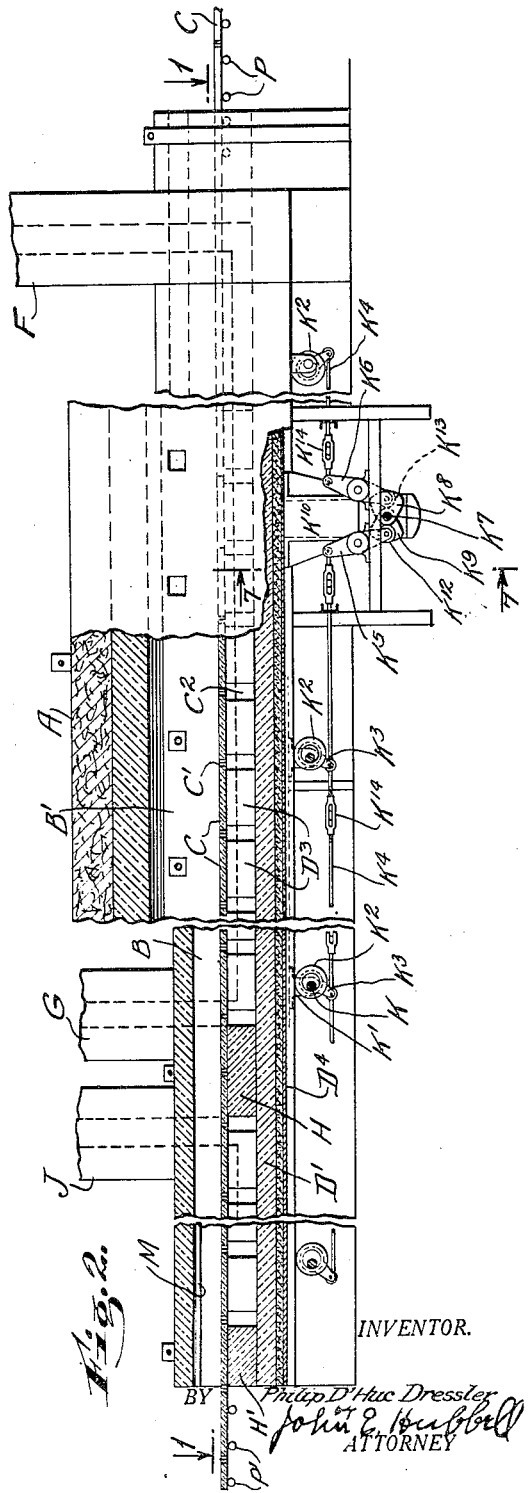
INVENTOR.
Philip D'Huc Dressler
BY John E. Hubbell
ATTORNEY July 4, 1933.   P. D'HUC DRESSLER   1,916,363
TUNNEL KILN
Filed Nov. 14, 1930   4 Sheets-Sheet 2
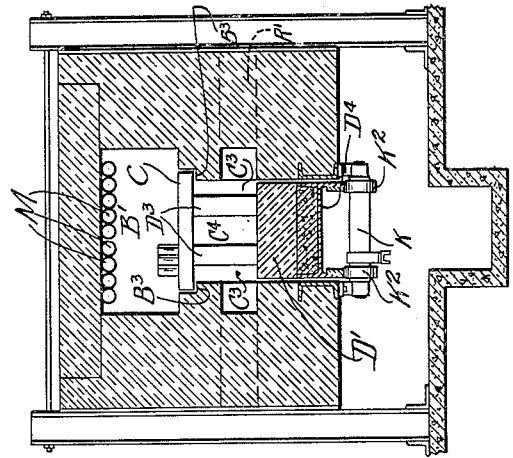
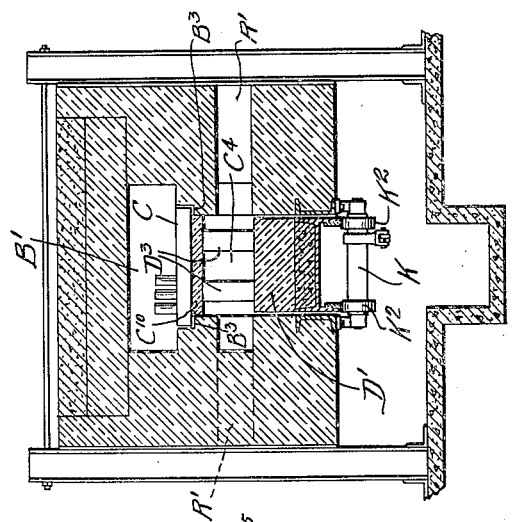
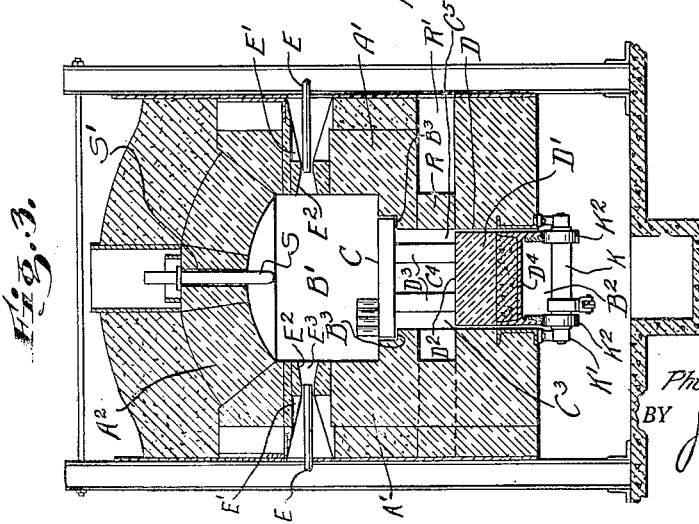
INVENTOR.
Philip D'Huc Dressler
BY John E. Hubbell
ATTORNEY

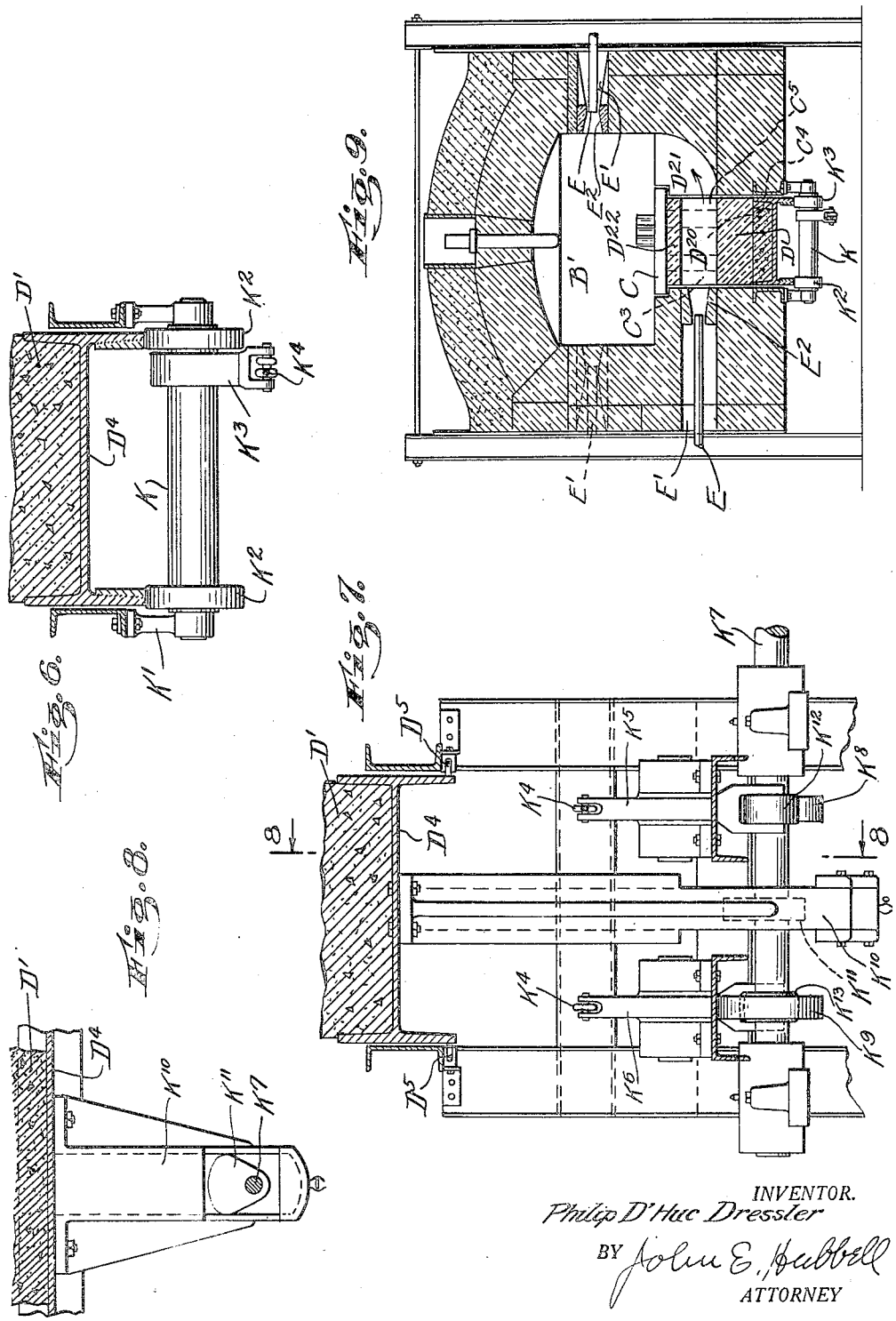

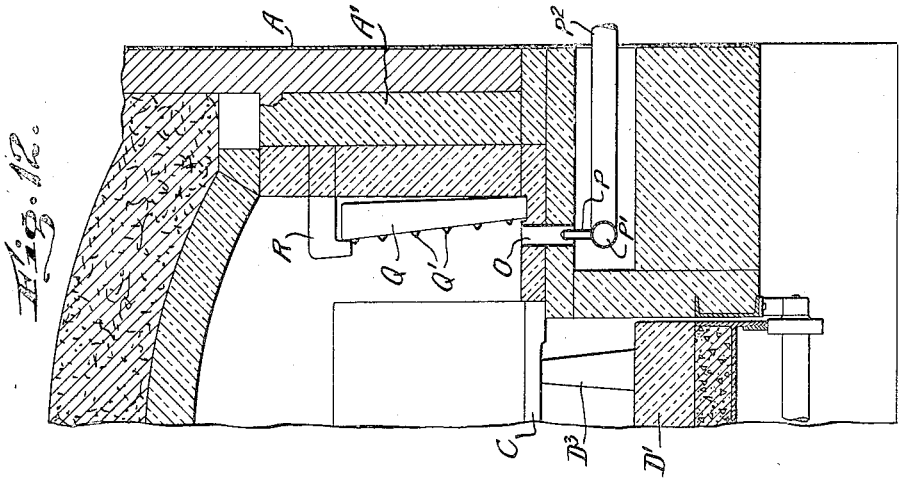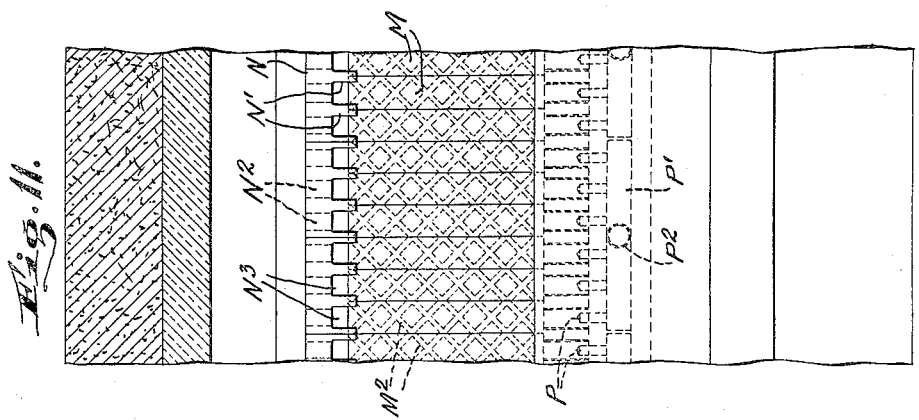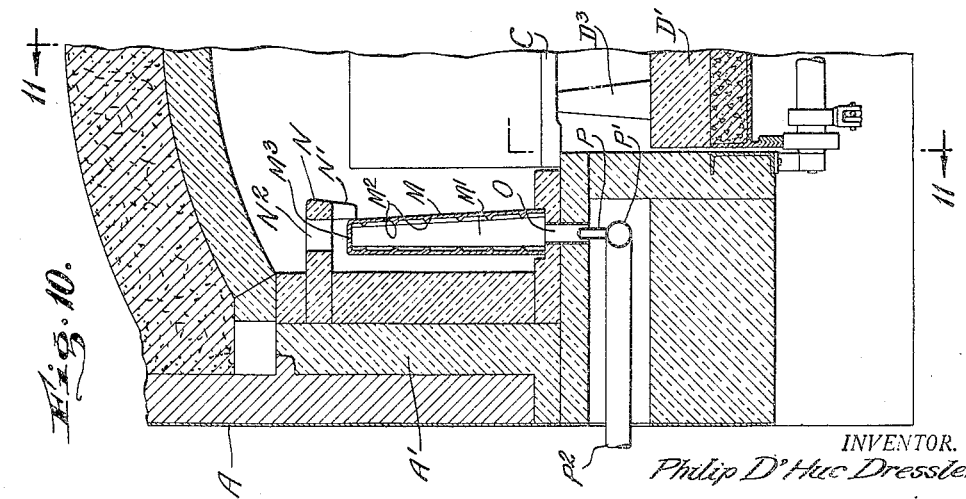

Patented July 4, 1933

1,916,363

UNITED STATES PATENT OFFICE

PHILIP D'HUC DRESSLER, OF PITTSBURGH, PENNSYLVANIA, ASSIGNOR TO SWINDELL-DRESSLER CORPORATION, OF PITTSBURGH, PENNSYLVANIA, A CORPORATION OF PENNSYLVANIA

TUNNEL KILN

Application filed November 14, 1930. Serial No. 495,660.

The present invention relates in general to furnaces or kilns adapted for the heat treatment of ceramic articles and particularly, to kilns of the tunnel type through which ceramic articles to be heat treated are moved by suitable supporting and conveying mechanism and in which the articles are progressively heated to a predetermined high temperature and subsequently cooled during their passage.

Tunnel kilns of this type normally include preheating, high temperature and cooling sections or zones arranged in series. In the high temperature or heating section, the temperature of the articles to be heated is raised to the desired maximum degree, either by direct or indirect contact of the articles with the highly heated products of combustion in kilns of the direct fired type or by the circulation of the kiln atmosphere in contact with the walls of closed combustion chambers at the sides of the kiln passageway to absorb heat therefrom and subsequently into contact with the articles in kilns of the muffle type. Kilns of the latter type are generally preferred where the maximum heating temperature desired is not high and/or where the circulation of high temperature products of combustion in contact with the articles being heated would cause discoloration or other harmful effects on the exposed surfaces of the articles.

In the use of direct fired kilns, whether employed to heat the articles to be treated to relatively high temperatures as is usual, or to heat the articles treated to more moderate temperatures, a considerable amount of goods spoilage is frequently experienced as a result of the overheating or underheating of different articles and of different portions of the individual articles. This is primarily due to the lack of uniformity in the distribution of heat to the articles. While these defects ordinarily develop in the high temperature zone of the kiln, their development may be wholly or largely due to improper heating conditions in the preheating zone. A further disadvantage arises in the excessive heat losses involved in the usual methods of circulating the products of combustion through the kiln and particularly, in the amount dissipated in the cooling section and to the external atmosphere by the refractory portions of the kiln cars ordinarily used, with a resultant retardation of the cooling action, increase in length of the cooling section required and increase in cost of heating the kiln.

The general object of my present invention is to provide an improved tunnel kiln construction and method of operating the same, characterized by provisions for effecting a rapid and uniform heating of all portions of the ceramic articles being treated to the desired temperature for maintaining cooling conditions, and for obtaining a material reduction in the kiln section dimensions and heat losses.

A further and more specific object of my invention is the provision of a direct fired tunnel kiln having heating provisions so constructed and arranged that the articles being treated absorb a relatively large portion of their required heat from high temperature products of combustion brought into intimate contact with substantially all of the exposed surfaces of the articles.

A further object is the provision of a direct fired tunnel kiln having an article conveying and supporting mechanism forming the bottom of the kiln chamber in which the articles being treated are exposed and characterized by the arrangement of heating gas flues or passages adjacent to and heating a substantial area of a refractory portion of the mechanism on which the articles are directly supported, whereby heat is conveyed to the bottom portions of the articles by radiation and conduction.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described preferred embodiments of the invention.

Of the drawings:

Fig. 1 is a horizontal section on the line 1—1 of Fig. 2 with certain parts broken away;

Fig. 2 is an elevation of the kiln with parts broken away and in section;

Fig. 3 is a vertical section on the line 3—3 of Fig. 1 illustrating the high temperature or firing section;

Fig. 4 is a vertical section on the line 4—4 of Fig. 1 illustrating the low temperature or preheating section;

Fig. 5 is a vertical section on the line 5—5 of Fig. 1 illustrating the cooling section;

Fig. 6 is an end view partly in section of a portion of the conveying mechanism;

Fig. 7 is an enlarged view of a vertical section on the line 7—7 of Fig. 2;

Fig. 8 is an enlarged elevation on the line 8—8 of Fig. 7;

Fig. 9 is a view similar to Fig. 3 of a modified kiln construction;

Fig. 10 is a transverse vertical section through the high temperature section of a modified kiln construction;

Fig. 11 is a longitudinal sectional view on the line 11—11 of Fig. 10; and

Fig. 12 is view similar to Fig. 10 of still another modification.

In the drawings and particularly in Figs. 1–8, I have illustrated a tunnel kiln A constructed in accordance with my invention and which is divided into a low temperature heating or preheating section $a$, an intermediate high temperature section $b$, and a cooling section $c$ extending from the high temperature section to the exit end of the kiln. The various sections are embodied in a continuous longitudinally extending structure of general rectangular transverse cross section and comprising a pair of thick side walls $A'$ and a top wall $A^2$ arranged to form a kiln chamber or passageway B extending throughout the length of the kiln and through which the articles to be heat treated are moved in the direction indicated by the arrow in Fig. 1. The kiln wall structure is built of suitable refractory and heat insulating materials and reinforced by buckstays and tie rods in a well known manner.

In the kiln construction illustrated, the ceramic articles to be treated are mounted on suitable supporting members, which are preferably a longitudinally arranged series of flat and relatively thin refractory slabs or bats C, adapted to be moved at intermittent intervals through the kiln chamber with the articles in position thereon by a slab supporting and conveying mechanism D positioned in, and extending substantially throughout, the kiln passageway at the under side of the slabs C. This mechanism D is of the step-by-step type and its various parts are continuously maintained in substantially the same position longitudinally of the kiln chamber. The kiln passageway B is divided by the slabs C into an upper closed goods chamber $B'$ in which the articles are positioned, and preferably exposed to the kiln atmosphere therein, and a lower section $B^2$ of reduced width in which the mechanism D is positioned. The portions of the kiln side walls at the upper end of the section $B^2$ are cut away to form a pair of narrow shelves $B^3$ at opposite sides of the passageway and extending the full length of the kiln.

The supporting slabs C are arranged to span the reduced portion of the kiln passageway and rest on the shelves $B^3$ during the intervals between slab moving operations of the conveying mechanism, as is hereinafter described. The conveying mechanism is preferably operable to periodically raise the slabs C above the supporting shelves $B^3$, and when in this raised position the slabs and a portion of the conveying mechanism are moved longitudinally of the kiln chamber a predetermined distance. When that point is reached, the conveying mechanism is operated to lower the slabs on to the shelves $B^3$. The conveying mechanism is then lowered out of contact with the slabs and returned longitudinally to its original position. By this arrangement the articles to be treated together with the slabs C will be periodically advanced through the kiln chamber, while the slab conveying mechanism D will remain in substantially the same position in the kiln chamber and be continuously subjected to the temperature conditions present in the different sections thereof.

The slab supporting and conveying mechanism D for carrying out the foregoing operations comprises a heavy relatively thick refractory walking beam section $D'$ extending substantially the full width of the kiln chamber section $B^2$ and having a flat upper surface $D^2$, on which a plurality of pairs of refractory blocks $D^3$ are longitudinally arranged. Each pair of blocks $D^3$ are transversely spaced apart and from the adjacent side walls of the kiln passageway, thereby forming three parallel flues or passages $C^3$, $C^4$ and $C^5$, directly below the article supporting slabs C. While the blocks $D^3$ are shown as rectangular in horizontal and vertical cross section, other shapes having flat top and bottom surfaces may be used. The blocks are so proportioned in height that their flat upper sides will be slightly below the under side of the corresponding slabs C when the latter are supported on the shelves $B^3$ and the walking beam $D'$ is in its lowermost position.

The mechanism for effecting the foregoing described movements of the slabs C, blocks $D^3$ and refractory walking beam $D'$ comprises a plurality of transverse shafts K longitudinally spaced below the kiln passageway section B² and eccentrically mounted in brackets K' attached to the stationary kiln structure. Each of the shafts carries a pair of roller bearings K² on which a horizontally arranged I-beam D⁴, constituting the bottom of the walking beam D', is mounted. Guide rollers D⁵ prevent sidewise movement of the walking beam. A lever K³ is rigidly connected to each of the shafts K with the free end of the levers connected through links K⁴ to one of a pair of rocking arms K⁵ and K⁶. Each of the lever links is made adjustable in length by a turnbuckle arrangement K¹⁴. In the present construction the shaft levers K³ in one portion of the kiln are connected to the rocking arm K⁵ while the levers in the remaining portion are connected to the rocking arm K⁶. The rocking arms K⁵ and K⁶ are located adjacent one another in an intermediate portion of the kiln and simultaneously actuated from a drive shaft K⁷ through cams K⁸ and K⁹, and rollers K¹² and K¹³, respectively, as shown in Figs. 2, 6 and 7. By this arrangement, rotation of the shaft K⁷ will effect oscillating movements of the rocking arms and levers, causing the walking beam D' and blocks D³ to be raised and lowered to move the slabs C off the shelves B³ and to return them to that position, respectively.

To secure the longitudinal movements of the walking beam necessary to advance the articles through the kiln chamber, a guide casing K¹⁰ is provided and secured to the web portion of the I-beam D⁴, depending therefrom intermediate the rocking arms K⁵ and K⁶, as shown in Fig. 8. A cam K¹¹ is mounted on the shaft K⁷ within the guide casing and arranged to contact with the longitudinally spaced sides thereof to move the casing and walking beam longitudinally on rotation of the shaft K⁷. The cams K⁸, K⁹ and K¹¹ are preferably arranged and proportioned to effect an advancing movement of the slabs when the walking beam has been raised sufficiently to move the slabs off the shelves B³ and to subsequently effect a return movement of the walking beam after the slabs are again lowered on to the shelves B³ and the blocks D³ are out of contact therewith.

In the high temperature heating section of the kiln is arranged a plurality of fluid fuel burners E mounted in suitable burner openings E' incorporated in the side walls of the kiln chamber section B' and opening thereto at points slightly below the under side of the kiln top wall A², which is arched as shown in Fig. 3 throughout this section of the kiln. The burner openings E' extend horizontally and may be staggered longitudinally of the kiln chamber. Refractory blocks E², having Venturi-shaped openings E³ formed therein, are arranged at the chamber end of the burner openings E'. Each fuel burner is positioned with its discharge end in the throat of the corresponding block opening E³ for the discharge therethrough of a combustible mixture.

When the fuel used for heating the kiln is gas, it is preferably premixed with air before its discharge into the kiln chamber. When oil is used as the fuel, air preheated in the cooling section in a well known manner is injected therewith. The amount of air supplied in each case will depend upon the desired combustion conditions in the kiln chamber. In most cases sufficient air should be supplied to ensure complete combustion of the burning gases in the chamber. Little or no excess air is supplied, thereby avoiding any reduction in the high temperature normally maintained in the chamber.

As shown in Figs. 1 and 2, the article supporting slabs C are arranged in and moved through the kiln with their adjacent ends in contact. In accordance with my present invention, the intermediate slab ends are cut away to provide a narrow transverse slot C', opening at its upper end to the kiln chamber section B' and at its lower end communicating with the longitudinal gas passages C³, C⁴ and C⁵. A main exhaust stack F is located at the entrance end of the preheating section and connected to the longitudinal passages C³, C⁴ and C⁵ by a transverse passage F'. A second exhaust stack G is located at the opposite end of the high temperature section and connected to the longitudinal heating gas passages by a transverse conduit G'.

With this construction and arrangement of the kiln parts, a combustible mixture is preferably introduced into the high temperature section of the kiln chamber at each of the burners and burned in suspension therein. A large volume of high temperature products of combustion is thereby created. In some cases the maximum temperature of these products may be 2600° F. or above, in other cases the maximum gas temperature may be lower. The articles to be heat treated, such as bisque ware, are desirably arranged on the slabs with the adjacent portions of the articles slightly spaced apart to permit the passage of gases therebetween.

The products of combustion pass downwardly and longitudinally of the kiln chamber into intimate contact with the exposed surfaces of the articles under the influence of the draft creating provisions described. The products of combustion flowing along the upper surface of the supporting slabs C and heating the articles arranged thereon are drawn downwardly through the transverse slots C' into the gas passages C³, C⁴ and C⁵, which conduct the heating gases longitudinally beneath the slabs C in the high temperature and preheating sections. The passage of the heating gases below the under surface of the slabs C causes these parts to be heated up to a substantial extent. The heat so absorbed is continuously transferred by conduction and radiation to the portions of the articles in contact with and directly above the upper surface of the slabs. A portion of the products of combustion may pass from the high temperature section above the slabs C in the preheating section and be subsequently drawn down through the various slab openings C' into the longitudinal gas passages, from which they are exhausted by the stack F. The contraflow passage of the gases longitudinally through the preheating section above and below the slabs therein creates a progressively increasing temperature of the articles in that section of the kiln chamber, which, as shown in Fig. 4, is substantially reduced in cross sectional area by lowering the height of the top wall $A^2$ thereof to increase the heating effect.

The temperature to which the articles are subjected in the high temperature and preheating sections may be further controlled by regulating the rate of flow and path of the products of combustion beneath the supporting slabs C. To provide a tortuous or zigzag flow of the heating gases, the blocks $D^3$ of adjacent pairs are longitudinally spaced apart, forming in effect transverse flow passages $C^2$ interconnecting the longitudinal passages $C^3$, $C^4$ and $C^5$.

In the present construction the provisions for controlling the flow include a series of refractory damper blocks R positioned in longitudinally spaced transverse passages R' in the kiln side walls of the preheating section below the level of the supporting slabs C and arranged to be moved inwardly and outwardly to vary the effective cross-sectional area of the longitudinal heating gas passages $C^3$ and $C^5$ in that portion of the kiln. When either of these passages are wholly or partly closed, the products of combustion will be wholly or partly deflected through an adjacent transverse passage $C^2$ into the other longitudinal passages. As shown in Fig. 1, the damper blocks R are staggered longitudinally of the kiln so that a portion of the heating gases may be constrained to follow a tortuous flow path below the supporting slabs. This construction with the usual exhaust stack control provides an effective regulation of the heating gas flow and ensures a thorough heating of the underside of substantially all portions of the slabs C carrying the articles.

Thermo-responsive measuring instruments, such as pyrometers S, may be inserted through suitable openings S' in the top wall of the kiln for determining the temperature conditions present and regulating the individual fuel burners and flow control dampers accordingly.

Another advantageous feature of my invention resides in the construction of the kiln cooling section c and the provisions for maintaining separation of the gases in that section from those in the high temperature section. As illustrated in Figs. 1, 2 and 5, the cooling section is separated from the adjacent end of the high temperature section, in so far as the portion of the kiln chamber below the supporting slab level is concerned, by a transverse bulkhead H, which is substituted for some of the blocks $D^3$. The bulkhead extends across the upper surface of the walking beam D' and separates the longitudinal gas passages $C^3$, $C^4$ and $C^5$ in the high temperature section from the corresponding passages in the cooling section. Similar bulkheads H' are positioned on the beam D' at the entrance and exit ends of the kiln to close the outer ends of the lower gas passages in the preheating and cooling sections. A stack J is connected to the various circulation passages below the slabs C at the exit side of the bulkhead H, and through which the circulation of the kiln atmosphere in the cooling section can be controlled. A series of horizontally arranged pipe M are supported at the under side of the top wall of the kiln chamber and arranged for the continuous circulation of a cooling medium, such as air, therethrough and effect a substantial reduction in the kiln chamber temperature towards its exit end.

The articles to be heat treated are initially placed on the supporting slabs C externally of the kiln and inserted therein as required by means of conveying rolls P at the entrance end and extending a sufficient distance into the entrance end of the kiln to enable the slabs to be moved onto the slab supporting and conveying mechanism. During the subsequent slab moving operations the walking beam successively deposits the loaded slabs on exit rolls P', over which they are withdrawn and unloaded. The time required for the operating cycle will be varied in accordance with the size and amount of the articles treated, the temperature to be attained, and the composition of the articles.

For some installations I contemplate the use of provisions for confining the heating of the ware while in the portion of the preheating section adjacent its entrance end to the heating gases passing through the heating gas passages $C^3$, $C^4$ and $C^5$. For this purpose, the slab supporting blocks $D^3$ on this portion of the walking beam are cut off at a predetermined level and the space so provided is occupied by one or more elongated refractory slabs $C^{10}$, forming a continuous refractory cover which is supported on the blocks $D^3$ in this section, as is shown in Figs. 1 and 4. The length of the slab or slabs $C^{10}$ depends upon the desired length of the muffle heated portion. As shown in Fig. 4 the covering slab structure extends the full width of the kiln chamber section B². The closing of the openings C' in the ware supporting slabs C by the slab C¹⁰ will confine the circulation of heating gases to the passages below the latter. This construction lowers the initial temperature to which the ware pieces are exposed after being moved into the kiln. A similar construction may be advantageously used in some cases for all or a portion of the cooling section.

In Fig. 9, I have illustrated a kiln of the general character heretofore described and incorporating a modified arrangement of the fuel burners. In this construction some of the fuel burners E and openings E' are arranged in the side walls below the level of the goods in the kiln chamber and discharge a combustible mixture of fuel and air into enlarged transverse passages D²⁰ formed in the high temperature section of the article supporting and conveying provisions and having special refractory slabs D²² separating the burner passage from ware slabs C. The portion of each side wall adjacent the discharge end of the passages D²⁰ is cut away as indicated at D²¹ to permit the burning gases to pass upwardly into the kiln chamber. The gases pass through an orbital flow path in the kiln chamber in the high temperature section and in intimate contact with the articles exposed on the slabs C and are subsequently drawn downwardly into the heating gas passages C³, C⁴ and C⁵ in the adjacent portion of the preheating section. This construction of the kiln heating means desirably increases the bottom heating effect in the kiln. The lower set of fuel burners may be operated with or without the upper fuel burners as operating conditions may warrant.

The kiln heating arrangements illustrated in Figs. 10–12 are especially adapted for use in installations in localities where natural gas is available as a fuel in sufficient quantities or where it is preferable to supply a greater amount of radiant heat to the sides of the ware pieces being heated than is usually possible with the heating provisions shown in Fig. 3.

In the construction illustrated in Figs. 10 and 11 the heating provisions comprise a series of built-up or integrally formed gas radiant sections M of inverted U-shaped cross-section and arranged in side by side contact to form an elongated combustion chamber M' of substantial height at each side of the kiln chamber. Each combustion chamber preferably tapers upwardly and has its lower open end mounted on the bench at the sides of the kiln. The sections at each end of the combustion chamber are suitably formed to prevent the passage of gases therethrough, while openings are provided in the horizontal portions M³ for the products of combustion. The sections are held in place by a series of L-shaped refractory members N which project inwardly from the combustion chamber side walls above the combustion chambers with one or more legs N' extending downwardly and engaging the inner heat radiating side of the chamber sections, preferably along the lines of contact with adjacent sections. The portion of the kiln structure directly below each combustion chamber M' is constructed with a series of short vertical conduits O which open into the lower end of the combustion chamber, with preferably a conduit O positioned below each section thereof. A fuel burner P opens into the lower end of each conduit O for the purpose of discharging a combustible mixture into the corresponding portion of the combustion chamber. The various burners P are preferably arranged in small groups with the burners in each group connected to a common manifold P', which is arranged to receive a supply of premixed air and combustible gas from a supply pipe P². The supply pipes P² may be equipped with suitable control valves to permit separate regulation of the combustion conditions in the various portions of each combustion chamber.

With the foregoing arrangement, the combustible mixtures introduced into each of the combustion chambers M' will burn rapidly therein and quickly heat the side walls of the combustion chambers to a high temperature by both convection and radiation. With combustion substantially complete in the combustion chamber, the heating gases generated will pass out through the upper end of the combustion chamber and into the upper portion of the kiln chamber. The passage of the gases is expedited by the formation of the refractory members N with perforations N² directly above the combustion chamber and openings N³ between the depending legs N'. The high temperature gases so introduced into the combustion chamber will be drawn downwardly through and in intimate contact with the ware into the walking beam structure as heretofore described.

The side walls of the combustion chambers are advantageously formed with projecting ridges or cones M² on their inner surfaces for the purpose of promoting combustion of the combustible mixture introduced into the chambers. These projections will be in a highly heated condition in operation and insure complete combustion within the combustion chambers by effecting ignition of any unburned or partly burned gases coming in contact therewith.

The construction illustrated in Fig. 12 differs from that in Figs. 10 and 11 by the absence of separate combustion chambers at the sides of the kiln chamber. In this construction, the combustible mixture is introduced directly into the kiln chamber through te pipes O and while burning passes upwardly between the sides of the load and the kiln chamber side walls. In their passage, the gases radiate a substantial amount of heat to the sides of the ware and are subsequently circulated downwardly through the ware and into and through the walking beam structure. The amount of heat radiated to the sides of the load is increased by the arrangement of a longitudinal series of high temperature refractory slabs Q adjacent the side walls of the kiln chamber and arranged to have their inner faces projecting into the path of flow of the burning gases. The inner face of each slab is shown as inclined inwardly with the slabs maintained in this position by a series of L-shaped refractory members R contacting with and holding the upper ends of the slabs. The inner face of each slab Q is preferably formed with a multiplicity of cone-like projections Q', which promote rapid and complete combustion of the combustible mixture and also increase the amount of the slab surface radiating heat to the sides of the ware.

While in accordance with the provisions of the statutes, I have illustrated and described the best forms of embodiment of my invention now known to me, it will be apparent to those skilled in the art that changes may be made in the form of the apparatus disclosed, such, for example, as its incorporation in a double or twin kiln, without departing from the spirit of my invention as set forth in the appended claims and that in some cases certain features of my invention may be used to advantage without a corresponding use of other features.

Having now described my invention what I claim as new and desire to secure by Letters Patent, is:

1. The method of heating ceramic articles to a high temperature in a continuous tunnel kiln chamber having a preheating section, a high temperature section, and a cooling section, which comprises continuously passing said articles while in a spaced exposed arrangement through the high temperature section, heating the upper portions of said articles by the absorption of radiant heat from a burning combustible mixture in said chamber above said articles, and transferring heat to the lower portions of said articles by convection and conduction from the products of combustion.

2. The method of heating ceramic articles to a high temperature in a continuous tunnel kiln chamber having a preheating section, a high temperature section, and a cooling section which comprises continuously passing said articles while in an exposed arrangement through the high temperature section, heating said articles while in said section by the absorption of radiant heat from a burning combustible mixture in said chamber immediately above said articles, and transferring heat to said articles while in said preheating section by the contraflow passage of heating gases externally of said chamber and below said articles.

3. The method of heating ceramic articles to a high temperature in a continuous tunnel kiln chamber having a preheating section, a high temperature section, and a cooling section, which comprises continuously passing said articles while in an exposed arrangement through the high temperature section, heating the upper portions of said articles by the absorption of radiant heat from a burning combustible mixture in said chamber immediately above said articles, and transferring heat to the lower portions of said articles by the direct contact of products of combustion therewith and by the passageway of heating gases externally of said chamber and directly below said articles.

4. A tunnel kiln comprising a kiln chamber having enclosing side and top walls, article supporting slabs forming the bottom wall of said chamber, slab supporting and conveying means arranged in substantially the same position at all times longitudinally relative to said chamber, a heating gas passage formed in said means directly below said slabs, and means for supplying high temperature heating gases to said kiln chamber and passing said gases while still at high temperatures from said chamber into and through said passage from said kiln chamber.

5. A tunnel kiln comprising a kiln chamber having enclosing side and top walls, article supporting slabs forming the bottom wall of said chamber, slab supporting and conveying means arranged in substantially the same position at all times longitudinally relative to said chamber, a longitudinally extending heating gas passage formed in said means directly below said slabs, and means for supplying heating gases to said chamber and passing said gases while still at high temperatures from said chamber into said longitudinal passage.

6. A tunnel kiln comprising a kiln chamber having enclosing side and top walls, article supporting slabs forming the bottom wall of said chamber, slab supporting and conveying means arranged in substantially the same position at all times longitudinally relative to said chamber, a longitudinal heat conducting passage formed in said means directy below said slabs, and means for supplying heating gases to said kiln chamber at high temperatures and passing them while still at high temperatures from said kiln chamber downwardly through said slab structure into said longitudinal passage.

7. A tunnel kiln comprising a kiln chamber having enclosing top and side walls, a fuel burner located in one of said walls for supplying a combustible mixture to said chamber to be burned in suspension therein, means forming the bottom wall of said chamber and supporting the articles to be heat treated in a position subjected to the radiant heat of the burning mixture, supporting and conveying means arranged in substantially the same position at all times longitudinally relative to said kiln chamber, a heating gas passage formed in said supporting and conveying means, and means for passing high temperature heating gases through said passage for heating the bottom wall of said chamber.

8. A tunnel kiln comprising a kiln chamber having enclosing top and side walls, a fuel burner located in one of said walls for supplying a combustible mixture to said chamber to be burned in suspension therein, means forming the bottom wall of said chamber and supporting the articles to be heat treated in a position subjected to the radiant heat of the burning mixture, supporting and conveying means arranged in substantially the same position at all times longitudinally relative to said kiln chamber, a longitudinally extending heating gas passage formed in said supporting and conveying means, and means for passing high temperature heating gases from said chamber through said longitudinal passage for heating the bottom wall of said chamber.

9. A tunnel kiln comprising a kiln chamber having enclosing top and side walls, a fuel burner located in one of said side walls for supplying a combustible mixture to said chamber to be burned in suspension therein, a plurality of refractory slabs forming the bottom wall of said chamber and supporting the articles to be heat treated in a position subjected to the radiant heat of the burning mixture, slab supporting and conveying means arranged in substantially the same position at all times longitudinally relative to said kiln chamber, a heating gas passage formed in said supporting and conveying means, and means for passing high temperature heating gases from said chamber downwardly through said slabs and through said passage for heating the bottom wall of said chamber.

10. A tunnel kiln comprising a tunnel kiln chamber having enclosing side and top walls, means for supplying heating gases to said chamber, a step by step article supporting and conveying mechanism, a plurality of refractory slabs in end to end contact and arranged to form the bottom wall of said chamber, a longitudinal passage in said mechanism directly below said bottom wall, and openings formed in the contacting ends of said slabs for the passage of heating gases from said chamber to said passage.

11. A tunnel kiln comprising a longitudinally extending kiln chamber having refractory top and side walls, a fluid fuel burner located in one of said side walls of said chamber, an article supporting and conveying mechanism, a plurality of refractory slabs arranged to form the bottom wall of said kiln chamber, refractory blocks in said mechanism and arranged below said slabs, said refractory blocks being spaced apart to form a heating gas passage therebetween, and means for passing heating gases from said chamber through said passage.

12. A tunnel kiln comprising a longitudinally extending kiln chamber having refractory top and side walls, a fluid fuel burner located in one of said side walls, a plurality of refractory slabs arranged to form the bottom wall of said kiln chamber, an article supporting and conveying mechanism having a refractory bottom section below said slabs and refractory blocks arranged on said bottom section for supporting said slabs in a predetermined operating position of said mechanism, said refractory blocks being spaced apart transversely to form a longitudinal heating gas passage below said bottom wall, and means for passing heating gases from said chamber through said passage.

13. A tunnel kiln comprising a longitudinally extending kiln chamber having refractory top and side walls, a fluid fuel burner located in one of said side walls, a plurality of refractory slabs arranged to form the bottom wall of said kiln chamber, an article supporting and conveying means including a refractory bottom section below said slabs and a plurality of longitudinally and transversely spaced refractory blocks arranged on said bottom section to support said slabs in a predetermined operating position of said means and to form heating gas passages below said bottom wall, means for passing heating gases through said passages, and means for controlling the effective area of said passages.

14. A tunnel kiln comprising successive preheating, high temperature, and cooling sections, a kiln chamber extending longitudinally through said sections, a refractory slab section forming the bottom wall of said kiln chamber, a step-by-step article supporting and conveying means having a longitudinal passage formed therein, means for passing heating gases through the portion of said passage in the preheating and high temperature sections, means for passing a cooling medium through the portion of said passage in the cooling section, and means separating said passage portions.

15. A tunnel kiln comprising successive preheating, high temperature, and cooling sections, a kiln chamber extending longitudinally through said sections, a refractory slab section forming the bottom wall of said kiln chamber, a step-by-step article supporting and conveying means having a longitudinal passage formed therein directly below said bottom wall, means for passing heating gases through the portion of said passage in the preheating and high temperature sections, means for passing a cooling medium through said passage portion in the cooling section, and a refractory bulkhead in said supporting and conveying means separating said passage portions.

16. A kiln comprising a chamber having enclosing side and top walls, a fuel burner located in one of said walls for supplying a combustible mixture to said chamber to be burned in suspension therein, a movable refractory bottom for said chamber supporting the articles to be heat treated in a position subjected to the radiant heat of the burning mixture, supporting and conveying means arranged in substantially the same position at all times longitudinally relative to said chamber, a transverse passage formed in said means and opening at one end to said chamber, and means for supplying and burning a combustible mixture in said passage.

17. A kiln comprising a chamber having enclosing side and top walls, a movable bottom for said chamber supporting the articles to be heat treated, supporting and conveying means arranged in substantially the same position at all times longitudinally relative to said chamber, a transverse passage formed in said means and opening at one end to said chamber, and means for supplying and burning a combustible mixture in said passage.

18. A kiln comprising a chamber having enclosing side and top walls, a movable refractory bottom for said chamber supporting the articles to be heat treated, supporting and conveying means arranged in substantially the same position at all times longitudinally relative to said chamber, a transverse passage formed in said means and opening at one end to said chamber, a longitudinal heating gas passage in said means directly below said bottom, means for supplying and burning a combustible mixture in said transverse passage, and means for passing products of combustion from said chamber downwardly through said bottom and into said longitudinal passage.

19. A continuous tunnel kiln having longitudinally arranged preheating, high temperature, and cooling sections, a kiln chamber extending longitudinally through said sections, fluid fuel burners for supplying a combustible mixture to said chamber, a plurality of refractory slabs arranged to form the bottom wall of said chamber, an article supporting and conveying system having refractory blocks for supporting said slabs in a predetermined operating position of said mechanism, said refractory blocks being spaced apart transversely to form a longitudinal heating gas passage below said bottom wall, openings in said kiln chamber bottom wall for the passage of heating gases from said kiln chamber into said heating gas passage, and a refractory cover on said blocks in one section of the kiln for closing said bottom wall openings.

20. A tunnel kiln comprising a longitudinally extending kiln chamber having top and side walls, means for supporting and conveying ceramic products to be heat treated through said kiln chamber, said means being arranged in substantially the same position at all times longitudinally relative to said chamber, an elongated combustion chamber positioned at each side of said kiln chamber and each having an extensive heat radiating surface arranged to radiate heat to the sides of said ceramic products, means for supplying a combustible gaseous mixture to and burning it in said combustion chambers, and means for circulating the products of combustion downwardly in intimate contact with said ceramic products.

Signed at Pittsburgh, in the county of Allegheny and State of Pennsylvania, this 12th day of November, A. D. 1930.

PHILIP D'HUC DRESSLER.